March 22, 1960  C. A. HATHAWAY ET AL  2,929,549
BLOWER WHEEL AND METHOD OF MAKING
Filed Oct. 25, 1954
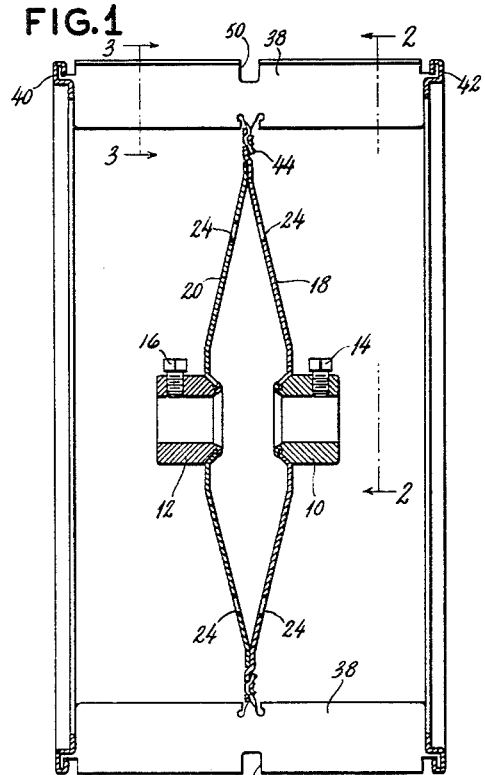
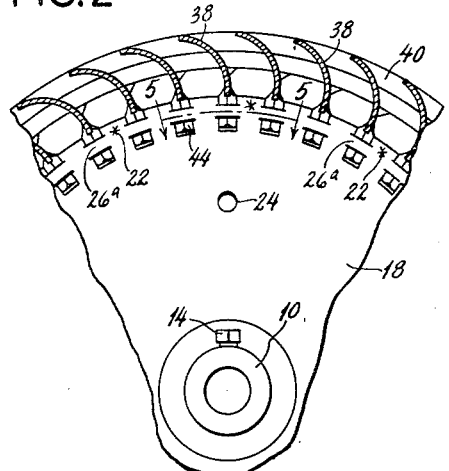
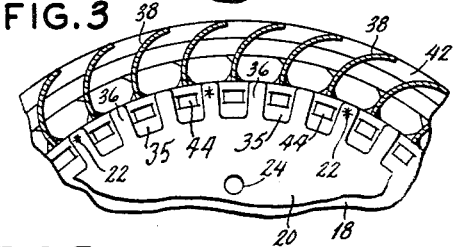
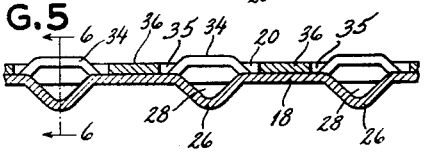
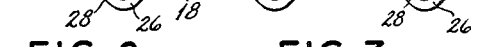
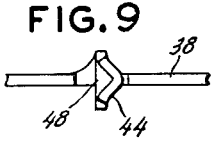
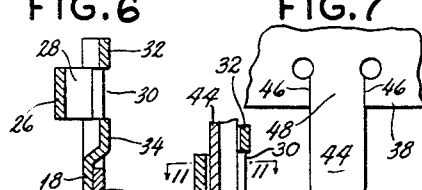
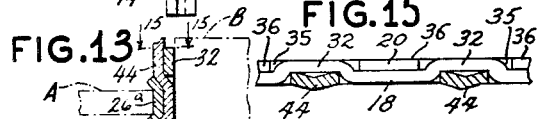
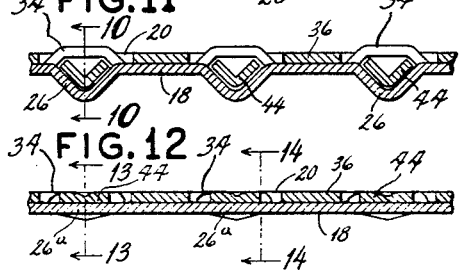
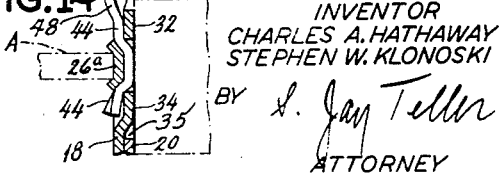
INVENTOR
CHARLES A. HATHAWAY
STEPHEN W. KLONOSKI
BY
ATTORNEY

United States Patent Office 2,929,549
Patented Mar. 22, 1960

2,929,549

BLOWER WHEEL AND METHOD OF MAKING

Charles A. Hathaway, Litchfield, and Stephen W. Klonoski, Torrington, Conn., assignors to The Torrington Manufacturing Company, Torrington, Conn., a corporation of Connecticut Application October 25, 1954, Serial No. 464,398

10 Claims. (Cl. 230—134)

The invention relates to a blower wheel of the type wherein there is an annular series of longitudinal air moving blades and wherein there is a generally radial supporting structure engaging the blades between the ends thereof to connect them with a central hub or hub means.

One object of the invention is to provide a simple, dependable and inexpensive connection between the radial supporting structure and the blades for holding the blades in fixed relationship with each other and with the said supporting structure. Another object of the invention is to provide a method for assembling the above-mentioned connection between the supporting structure and the blades.

In the drawing we have shown in detail a preferred embodiment of the structural features of the invention and a preferred method of making the same, but it will be understood that various changes may be made from the construction and the method shown, and that the drawing is not to be construed as defining or limiting the scope of the invention, the claims forming a part of this specification being relied upon for that purpose.

Of the drawing:

Fig. 1 is a vertical longitudinal sectional view of a blower wheel embodying the invention.

Fig. 2 is a fragmentary transverse sectional view taken along the line 2—2 of Fig. 1.

Fig. 3 is a fragmentary transverse sectional view taken along the line 3—3 of Fig. 1.

Fig. 4 is an enlarged fragmentary top view of the two discs of the radial supporting structure prior to the assembly of the blades therewith.

Fig. 5 is a view which is somewhat similar to Fig. 4 but which is in section along the line 5—5 of Fig. 2.

Fig. 6 is a fragmentary vertical sectional view taken along the line 6—6 of Fig. 5.

Fig. 7 is an enlarged fragmentary side view of a blank for one of the blades.

Fig. 8 is a view similar to Fig. 7 but showing the tongue of the blade blank twisted.

Fig. 9 is a bottom view of the blade blank as shown in Fig. 8.

Fig. 10 is a fragmentary vertical sectional view generally similar to Fig. 6 but taken along the line 10—10 of Fig. 11.

Fig. 11 is a view similar to Fig. 5 and taken along the line 11—11 of Fig. 10, this view showing the tongues of the blades preliminarily in place.

Fig. 12 is a sectional view similar to Fig. 11 but showing the parts fully engaged.

Fig. 13 is a sectional view similar to Fig. 10 but showing the parts fully engaged, this view being taken along the line 13—13 of Fig. 12.

Fig. 14 is a view somewhat similar to Fig. 13 but taken along the line 14—14 of Fig. 12.

Fig. 15 is a sectional view somewhat similar to Fig. 12 but taken along the line 15—15 of Fig. 13.

Referring to the drawing, the blower wheel as illustrated includes a hub means which is shown as comprising two separate similar hubs 10 and 12. When the hub means comprises two hubs such as 10 and 12, the two hubs are in longitudinal register with each other and are rotatable about the same longitudinal axis. They are adapted for mounting on a rotatable shaft and as shown set screws 14 and 16 are provided for connecting the hubs with the shaft. A radial blade supporting structure is connected with the hub means, this structure including at least one generally radial supporting disc 18 which has its inner portion rigidly connected with the hub means. Preferably and as shown, the said structure includes two generally similar discs 18 and 20 rigidly connected respectively with the two hubs 10 and 12. The discs 18 and 20 are connected with each other near their peripheries as for instance by spot welding, as indicated at 22, 22. The discs 18 and 20 are preferably partly conical in shape so that the hubs 10 and 12 are spaced apart longitudinally and so that the portions of the discs adjacent the hubs converge toward their connected peripheral portions. One or more drain holes such as 24, 24 may be provided in at least one of the discs to permit the escape of water which might otherwise accumulate in the space between the discs.

At least one of the discs, for instance the disc 18, is slashed near its periphery to form an annular series of equally spaced circularly extending portions 26, 26 which are integral with the main body of the disc. The said portions 26, 26 are separated from the main body by circularly extending slashes and the said portions are initially arches which are longitudinally offset from the said main body so as to provide an annular series of equally spaced radial openings 28, 28 between the said arches and the said main body. The arched portions 26, 26 are preferably V-shaped as shown. The radial openings 28, 28 are best shown in Fig. 4 and it will be seen that the said arches 26, 26 constitute the outer walls of the said radial openings. When the arched portions 26, 26 are V-shaped as is preferred, the openings 28, 28 are substantially triangular in cross section. The said portions or arches 26, 26 are preferably spaced inwardly from the periphery of the corresponding disc, as clearly shown in Figs. 2 and 6. The portions or arches 26, 26 are formed by slashing or lancing the metal of the disc, thus providing apertures 30 behind the corresponding arches as best shown in Figs. 6 and 10.

Preferably, as best shown in Figs. 4 to 6, the metal of the disc 18 is also initially formed with arched portions or arches 32, 32 and 34, 34 which project in the direction opposite the direction of projection of the arches 26, 26. The arches 32, 32 are respectively adjacent the radially outward sides of the openings 30 and the arches 34, 34 are respectively adjacent the radially inward sides of the said openings 30 and in radial alignment with the arches 32, 32. The arches 32, 32 and 34, 34, when provided, constitute the inner walls of the radial openings 28, 28. For convenience of description the said arches 32, 32 and 34, 34 will be considered as included in the main body of the disc 18.

When there are two discs, such as 18 and 20, the second disc 20 is preferably notched at 35, 35 to provide clearances for the arches 32, 32 and 34, 34 of the disc 18, the said disc 20 having portions 36, 36 which are between adjacent pairs of the last said arches. The disc 18 and its connected hub serve, preferably in cooperation with the disc 20, as an initial central support structure for the blower wheel, this central structure supporting the blades of the blower wheel as hereinafter explained.

The blower wheel includes an annular series of equally spaced longitudinal air moving blades 38, 38, the said series being concentric with the blower wheel axis and the blades of the said series being closely adjacent the periphery of the disc or discs. The blades 38, 38 may have any usual or preferred cross-sectional shape and the blade shape does not constitute any part of the present invention.

Means are provided at the ends of the blades 38, 38 for connecting them with each other, these means being shown as being two similar end rings 40 and 42. The details of connection between the blades and the end rings may be in accordance with conventional practice and do not constitute any part of the present invention.

The blades 38, 38 are preferably formed from sheet metal and they are provided respectively with integral tongues 44, 44 which extend generally inwardly therefrom and perpendicularly thereto near the centers thereof, one tongue being shown in detail in Figs. 7, 8 and 9. Each blade 38 with its integral tongue 44 constitutes a sheet metal blade element. The tongue projects perpendicularly to the main portion of the blade element. Fig. 7 shows the tongue 44 partly separated from the body of the blade by slashes 46, 46 and ready for forming and twisting. Figs. 8 and 9 show the tongue 44 bent or folded along a line longitudinal of the tongue to provide two parts in angulated relationship to each other, the tongue having the cross sectional shape more clearly shown in Fig. 9. The tongue 44 is twisted at the area 48 immediately adjacent the main body of the blade so that it is at an angle of 90° to said main body.

For economy of manufacture, the tongue 44 on one blade 38 may comprise metal which would otherwise be a part of another blade, the result being that each blade has a notch 50 therein. However, the provision of notches, such as 50, is not an essential part of the invention.

During assembly, the tongues 44, 44 on the several blades 38, 38 are inserted in the initially provided radial openings 28, 28 in the central support structure, the openings being of such size as to receive the shaped tongues with ample clearance, as shown in Figs. 10 and 11.

When the blades have been assembled with their tongues 44, 44 in the openings 28, 28, as shown in Figs. 10 and 11, and when the blades have been connected with the end rings 40 and 42, the arches 26, 26 are pressed longitudinally to force them toward the main body of the disc and into firm engagement with the corresponding tongues 44, 44, the blades 38, 38 being thus firmly held in fixed relationship to the disc 18.

Preferably, the arches 26, 26 of the disc 18 are pressed with such force that the central area thereof is substantially or completely flattened, as shown in Fig. 12. Said portions 26, 26 that have been described as arches are now flattened to constitute circularly extending flat portions 26ª, 26ª. At the same time the arches 32, 32 and 34, 34 are partially flattened as shown in Figs. 12 to 15. The flattening of the arches 26, 26 serves to also flatten the tongues 44, 44. The width of the triangular opening between each arch 26 and the corresponding arches 32 and 34 is slightly less than the width of the flattened tongue 44. Therefore, during the flattening of each tongue, its edges press against and distort the walls of the corresponding radial opening. The described distortion resulting from the flattening of the tongue insures a firm engagement of said tongue with the disc 18.

The engaged portion of each tongue 44 is preferably also shifted or offset so that the outer face of the tongue approximately registers with the inner face of the main body of the disc 18, as shown in Figs. 13 and 14. This additionally serves to hold the blade in firm engagement with the disc.

All of the arches 26, 26 are preferably pressed simultaneously by the plunger A of a suitable press as shown in Figs. 13 and 14, the arches 32, 32 and 34, 34 of the disc 18 and the portions 36, 36 of the disc 20 being held by a cooperating anvil B of the said press. The engagement of the portions 36, 36 of the disc 20 with the anvil B of the press permit the engaged portions of the tongues to be shifted as described.

Preferably the plunger A has an annular portion somewhat narrower than the arches 26, 26. As the said arches are flattened to become the said circularly extending portions 26ª, 26ª, the directly engaged portions of the tongues 44, 44 are also flattened as previously stated, but the portions of the tongues at the outer and inner sides of the said portions 26ª, 26ª are not completely flattened and remain partly shaped, as shown in Fig. 15, these last said portions being offset so as to engage the outer and inner edges of the portions 26ª, 26ª, as shown in Fig. 13. The said outer and inner edges are curved as shown as the result of their engagement with the offset tongues. The engaged portion of each tongue 44 also engages the inner and outer edges of the arches 32 and 34, as also shown in Fig. 13. As the result of the distortion under pressure, the openings 28, 28 are partially closed but they remain generally radial with the tongues 44, 44 therein. The described relative offsetting of portions of the tongues positively prevents relative radial movement of the said tongues and the blades. Thus there is provided an interlocking relationship between the tongue and the disc.

In making the blower wheel the discs 18 and 20 are connected with the hubs 10 and 12 and the discs are connected with each other by welding, as previously described. Then the blades 38, 38 are assembled with the disc structure, the tongues 44, 44 on the blades being inserted in the radial openings 28, 28, as previously described. The assembled parts are preferably held temporarily in a suitable fixture so that the annular series of blades is concentric with the axis of the hubs. Thereafter the end rings 40 and 42 are put in place so as to connect the blades with each other and to hold them in their proper spaced relationship. Finally the arches 26, 26 of the disc 18 are subjected to longitudinal pressure, as previously described, so as to be flattened and thereby lock the blade tongues in fixed relationship with the disc. After the pressing operation the parts can be removed from the fixture.

The invention claimed is:

1. In a centrifugal blower wheel, the combination of a hub means rotatable about a central longitudinal axis and adapted for mounting on a rotatable shaft, first and second generally radial supporting discs having their inner portions rigidly connected with the hub means, said discs being connected with each other near their peripheries and said first disc being formed near its periphery with an annular series of equally spaced circularly extending portions which are integral with the main body of the disc and which are separated therefrom by circularly extending slashes so as to provide an annular series of equally spaced generally radial openings between said circularly extending portions and said main body and said second disc being provided with an annular series of equally spaced peripheral notches which are opposite the circularly extending portions of said first disc, an annular series of equally spaced longitudinal air moving blades adjacent the peripheries of the discs, means at the ends of the blades for connecting them with each other, and a plurality of tongues respectively connected with the several blades and extending generally inwardly therefrom near the centers thereof and into and through said generally radial openings, portions of said tongues being offset so as to be positioned within the notches of said second disc and so as to enter and fit the corresponding apertures in the main body of the first disc and said tongue portions being engaged by the corresponding circularly extending portions of said first disc so that the blades are firmly connected with the discs.

2. In a centrifugal blower wheel, the combination of a hub rotatable about a central longitudinal axis and adapted for mounting on a rotatable shaft, a generally radial supporting disc having its inner portion rigidly connected with the hub, said disc having near its periphery an annular series of equally spaced circularly extending portions which are integral with the main body of the disc and which are separated therefrom by circularly extending slashes and said disc further having pairs of circularly extending arched portions which arched portions of each pair are respectively adjacent the corresponding circular slashes and are arched away from the said circularly extending portions so as to provide an annular series of equally spaced generally radial openings between the said circularly extending portions and said arched portions, an annular series of equally spaced longitudinal air moving blades adjacent the periphery of the disc, means at the ends of the blades for connecting them with each other, and a plurality of tongues respectively connected with the several blades and extending generally inwardly therefrom near the centers thereof, said tongues respectively extending into and fitting said generally radial openings and thus serving to connect the blades with the disc.

3. In a centrifugal blower wheel, the combination of a hub means rotatable about a central longitudinal axis and adapted for mounting on a rotatable shaft, first and second generally radial supporting discs having their inner portions rigidly connected with the hub means, said discs being connected with each other near their peripheries and said first disc having near its periphery an annular series of equally spaced circularly extending portions which are integral with the main body of the disc and which are separated therefrom by circularly extending slashes and said first disc further having pairs of circularly extending arched portions which arched portions of each pair are respectively adjacent the corresponding circular slashes so as to provide an annular series of equally spaced generally radial openings between the said circularly extending portions and said arched portions and said second disc having an annular series of equally spaced peripheral notches which receive said arched portions of said first disc, an annular series of equally spaced longitudinal air moving blades adjacent the peripheries of the discs, means at the ends of the blades for connecting them with each other, and a plurality of tongues respectively connected with the several blades and extending generally inwardly therefrom near the centers thereof and into and through said generally radial openings, portions of said tongues being offset so as to be positioned within the notches of said second disc and so as to enter and fit the corresponding apertures in the main body of the first disc and said tongue portions being engaged by the corresponding circularly extending portions of said first disc so that the blades are firmly connected with the discs.

4. An initial central support structure for a centrifugal blower wheel comprising in combination a hub rotatable about a central longitudinal axis and adapted for mounting on a rotatable shaft, and a generally radial supporting disc having its inner portion rigidly connected with the hub, said disc being formed near its periphery with an annular series of equally spaced circularly extending portions which are arched in one direction and are integral with the main body of the disc and which are separated therefrom by circularly extending slashes and said disc being further formed with pairs of circularly extending arched portions with those of each pair respectively adjacent the corresponding circular slashes which last said arched portions are arched in the opposite directions so as to provide an annular series of equally spaced generally radial openings between the first said arched portions and second said arched portions which radial openings are adapted for receiving radial tongues on an annular series of blower wheel blades.

5. An initial central support structure for a centrifugal blower wheel as set forth in claim 4, wherein the first said arched portions are V-shaped and wherein the radial openings are substantially triangular in cross section.

6. An initial central support structure for a centrifugal blower wheel, comprising in combination a hub means rotatable about a central longitudinal axis and adapted for mounting on a rotatable shaft, and two similar generally radial first and second supporting discs having their inner portions rigidly connected with the hub means, said first disc being formed near its periphery with an annular series of equally spaced circularly extending portions which are arched in one direction and are integral with the main body of the disc and which are separated therefrom by circularly extending slashes and said disc being further formed with pairs of circularly extending arched portions with those of each pair respectively adjacent the corresponding circular slashes which last said arched portions are arched in the opposite directions so as to provide an annular series of equally spaced generally radial openings between the first said arched portions and the second said arched portions which radial openings are adapted for receiving radial tongues on an annular series of blower wheel blades, and said second disc being provided with an annular series of equally spaced peripheral notches into which the second said arched portions of the first disc extend.

7. The herein disclosed method for making a centrifugal blower wheel, which method comprises providing a sheet metal supporting disc rotatable about a central longitudinal axis, slashing the disc and shaping it to provide an annular series of equally spaced circularly extending initially arched portions which are integral with the main body of the disc and are longitudinally offset therefrom so as to provide an annular series of equally spaced radial openings between said arched portions and said main body, providing a plurality of similar air moving blades having tongues projecting therefrom transversely of the lengths thereof each of which tongues is folded to provide two parts in angulated relationship to each other and each of which tongues has a width slightly less than the widths of a corresponding radial disc opening, longitudinally positioning the said blades in an annular series surrounding the disc and with their tongues extending generally inwardly into said radial openings, and longitudinally pressing the initially arched circularly extending portions of the disc to force them toward the main body of the disc and into engagement with the tongues on the blades so as to flatten said tongues and thereby force the edges thereof into firm engagement with the walls of said radial openings.

8. The herein disclosed method for making a centrifugal blower wheel, which method comprises providing a sheet metal supporting disc rotatable about a central longitudinal axis, slashing the disc and shaping it to provide an annular series of equally spaced circularly extending initially arched portions which are integral with the main body of the disc and are V-shaped and longitudinally offset from said main body so as to provide an annular series of equally spaced radial openings which are substantially triangular and are between said V-shaped arched portions and said main body, providing a plurality of similar air moving blades having tongues projecting therefrom transversely of the lengths thereof which tongues are folded to provide two parts at an angulated relationship to each other and which tongues are adapted to enter said radial openings, longitudinally positioning the said blades in an annular series surrounding the disc and with their tongues extending generally inwardly into and beyond the said radial openings with the angulated parts of the tongues parallel with and closely adjacent the sides of said V-shaped radial openings, and longitudinally pressing the initially arched circularly extending portions of the disc to force them toward the main body of the disc sufficiently to engage the tongues on the blades and to flatten the engaged portions of the tongues and to offset said engaged portions from the portions thereof that are inwardly beyond the circularly extending portions of the disc so as to firmly hold the blades in fixed relationship to the disc.

9. The herein disclosed method for making a centrifugal blower wheel, which method comprises providing a sheet metal supporting disc rotatable about a central longitudinal axis, slashing said disc and shaping it to provide an annular series of equally spaced first circularly extending arched portions which are integral with the main body of the disc and further shaping said disc to provide pairs of second circularly extending arched portions with those of each pair respectively adjacent the edges of the corresponding first arched portions which first and second arched portions project oppositely and provide an annular series of equally spaced radial openings, providing a plurality of similar air moving blades having tongues projecting therefrom transversely of the lengths thereof, longitudinally positioning the said blades in an annular series surrounding the disc and with their tongues extending generally inwardly into the said radial openings, and longitudinally pressing the arched portions of said disc to force them toward each other and into firm engagement with the tongues on the blades so as to firmly hold the blades in fixed relationship to the disc, said pressing being sufficient to completely flatten said first arched portions and to partially flatten said second arched portions.

10. The herein disclosed method for making a centrifugal blower wheel, which method comprises providing first and second sheet metal supporting discs rotatable about a central longitudinal axis, slashing said first disc and shaping it to provide an annular series of equally spaced first circularly extending arched portions which are integral with the main body of the disc and further shaping said first disc to provide pairs of second circularly extending arched portions with those of each pair respectively adjacent the edges of the corresponding first arched portions which first and second arched portions project oppositely and provide an annular series of equally spaced radial openings, providing said second disc with an annular series of equally spaced peripheral notches, assembling the two discs so that their axes are coincident and so that the second arched portions of the first disc are within the notches in the second disc, providing a plurality of similar air moving blades having tongues projecting therefrom transversely of the lengths thereof, longitudinally positioning the said blades in an annular series surrounding the disc and with their tongues extending generally inwardly into the said radial openings, and longitudinally pressing the arched portions of said first disc to force them toward each other and into firm engagement with the tongues on the blades so as to firmly hold the blades in fixed relationship to the discs, said second arched portions of the first disc remaining in the openings of the second disc.

References Cited in the file of this patent
UNITED STATES PATENTS

| | | |
|---|---|---|
| 2,115,367 | Levy | Apr. 26, 1938 |
| 2,176,325 | Bretzlaff et al. | Oct. 17, 1939 |
| 2,240,238 | Baker | Apr. 29, 1941 |

FOREIGN PATENTS

| | | |
|---|---|---|
| 19,251 | Great Britain | of 1899 |
| 861,734 | Germany | Jan. 5, 1953 |